Patented Nov. 17, 1942

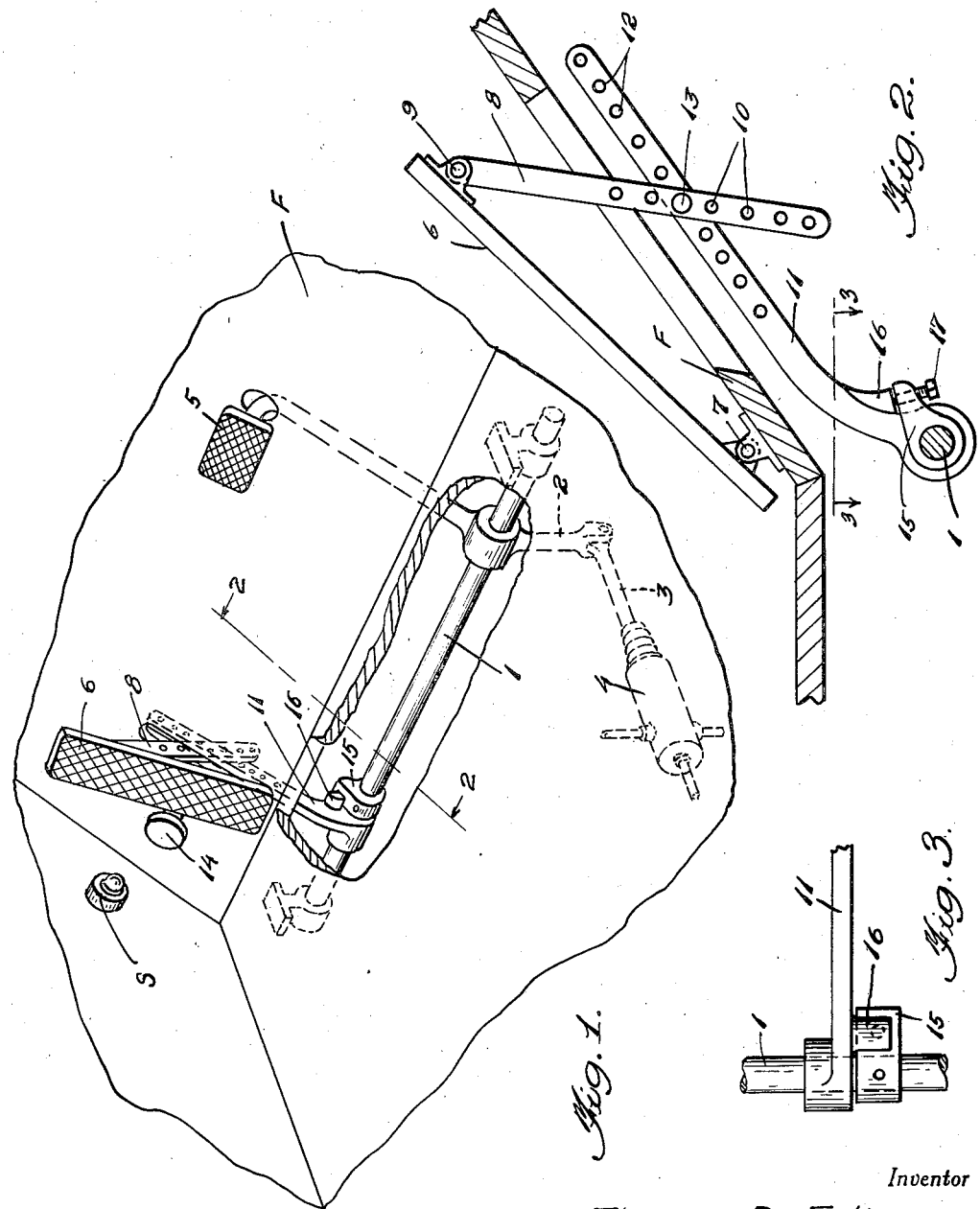

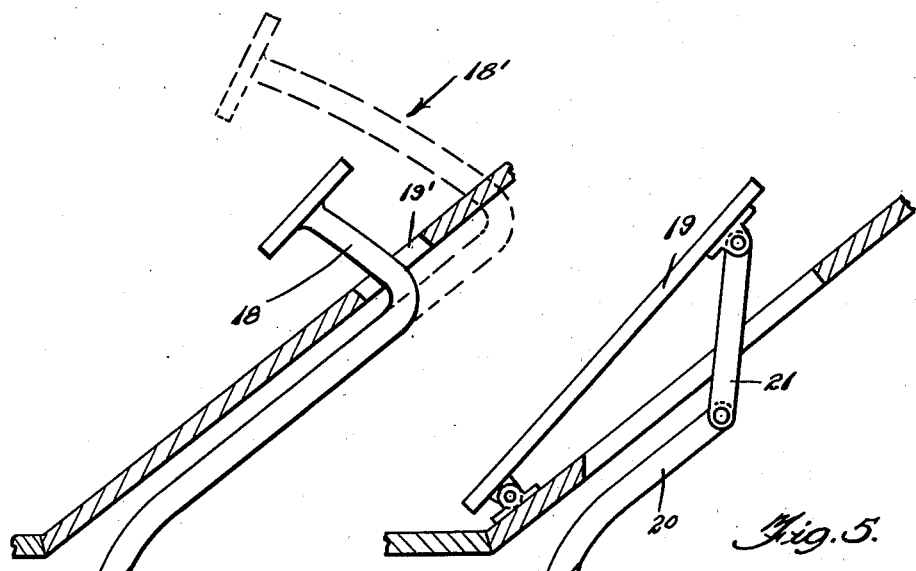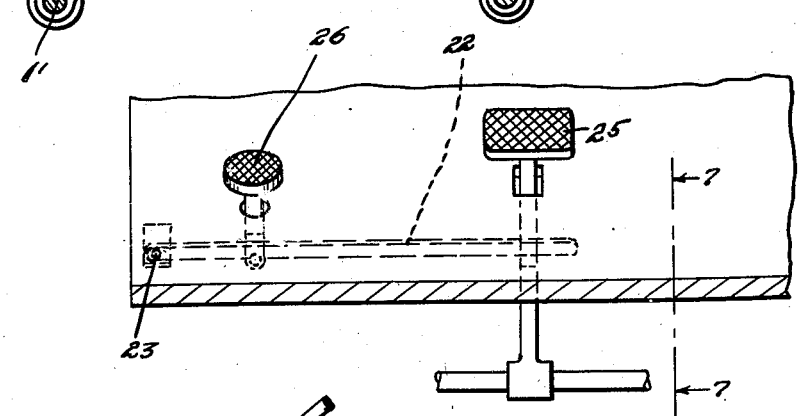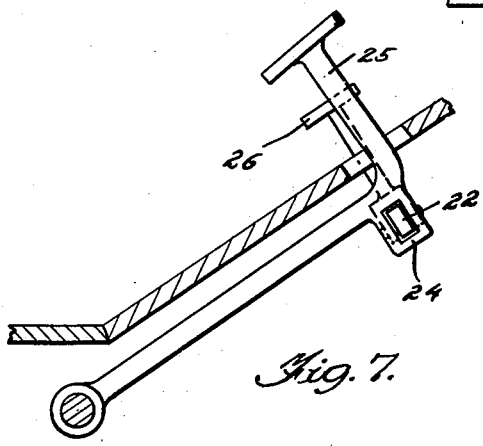

2,302,436

UNITED STATES PATENT OFFICE 2,302,436

BRAKE PEDAL MECHANISM

Thomas D. Felton, Hernando, Fla.

Application September 13, 1940, Serial No. 356,691

2 Claims. (Cl. 74—478)

This invention relates to pedal mechanisms, the general object of the invention being to provide means whereby the brakes of a motor vehicle can be quickly applied to stop the vehicle in the minimum amount of time and to reduce fatigue of the driver where he has to use the brakes frequently, such as when driving in heavy traffic.

Another object of the invention is to provide means whereby the left foot of the operator is used for applying the brakes with the parts so arranged that the driver can hold his foot in a comfortable position for applying the brakes and the brakes may be applied by a short movement of the pedal.

Another object of the invention is to provide means whereby the right foot pedal is depressed when the left foot pedal is depressed so that the operator can readily shift his right foot from the accelerator to the right foot pedal.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a fragmentary view looking toward the bottom portion of the front part of a vehicle body, with parts broken away, and showing one manner of carrying out my invention.

Figure 2 is a section on the line 2—2 of Figure 1.

Figure 3 is a section on the line 3—3 of Figure 2.

Figure 4 is a vertical sectional view through part of the floor of a motor vehicle and showing a different form of foot pedal from that shown in Figure 1.

Figure 5 is a similar view showing still another form of the pedal mechanism.

Figure 6 is a vertical sectional view through a part of the floor of a motor vehicle showing another arrangement of the invention.

Figure 7 is a section on the line 7—7 of Figure 6.

In these drawings the numeral 1 indicates a rock shaft supported for rotary movement under the front portion of the floor of a motor vehicle and having an arm 2 depending therefrom which is connected to a rod 3 for operating the brakes of the vehicle in any suitable manner, such as the master cylinder 4 of a hydraulic brake mechanism now in use on most vehicles. It is to be understood that the shaft 1 will operate the brake mechanism in any suitable manner and that the brake mechanism may be of any suitable construction. The brake pedal 5 is adapted to be actuated by the right foot of the operator in the usual manner and this pedal may be of any suitable type. In carrying out my invention I provide a pedal 6 to be actuated by the left foot of the operator and this pedal is shown as being in the form of an elongated and narrow foot piece which is pivoted adjacent its lower end to the floor board F as shown at 7. A link 8 is pivoted as at 9 to the upper portion of the under face of the pedal 6 and said link 8 has a row of holes 10 therein. An arm 11 is fastened to the shaft 1 in any suitable manner and extends upwardly and forwardly under the floor F and has a longitudinal extending row of holes 12 therein. A pin or bolt 13 is adapted to pass through any desired ones of the holes 10 and the holes 12 to adjustably connect the link 8 to the arm 11 so that the amount of movement of the arm 11 and therefor the shaft 1 under the action of the pedal 6 when the same is depressed, can be adjusted as desired. A foot rest 14 of any suitable construction may be supported from the floor F adjacent the pedal 6 so that the operator can rest his foot on this member 14 and then when he desires to apply the brakes it is simply necessary for him to rock his foot on this support 14 into engagement with the pedal 6 and depress the same to apply the brakes.

A lug 15 is connected with the shaft 1 adjacent the arm 11 and a projection 16 is formed on the under part of the arm 11 for engaging the lug 15 or the screw 17 which is threaded through a hole in the lug 15 and as will be seen when the arm 11 is depressed by downward movement of the pedal 6 the lug or member 16 will engage the lug 15 or the screw 17 so that the shaft is rocked to apply the brakes and this movement of the shaft also moves the right foot pedal 5 downwardly.

The parts which are connected with the pedal 6 are so constructed and arranged and adjusted that the brakes will be applied by a short downward movement of the pedal and when the pedal is in raised or in inoperative position it will be close to the floor so that the foot of the user can rest thereon in a natural position or the foot of the user can rest on the support 14, which is relatively low, in a natural position or if the foot is placed in a position adjacent the pedal the foot can be easily and quickly placed on the pedal and the pedal depressed to apply the brakes very quickly and without necessitating raising the foot to a considerable extent to place it on the pedal as is now necessary with vehicle pedals as now constructed and arranged.

As will be seen when the left foot depresses the pedal 6 the shaft 1 is rocked to apply the brakes and this movement also lowers the right foot pedal so that the operator can readily shift his right foot from the accelerator on to the right pedal and without lifting the foot as would be necessary if the right pedal was in its normal position. By having the lugs 15 and 16 the right foot can depress the pedal 5 to more firmly apply the brakes as, of course, the shaft 1 can be rocked by the right pedal without moving the left pedal or its connecting means after the left pedal has been lowered by the left foot.

However, it is to be understood that the left pedal can be directly connected with the brakes so that the brakes are fully applied by downward movement of the left pedal under pressure from the left foot and this movement is very short so that the brakes are applied in the minimum amount of time when the pedal is depressed and by having the holes in the link 8 and arm 12 as shown in Figure 2 the throw of the pedal 6 can be adjusted as will be understood.

Figure 4 shows the invention as carried out with a left foot pedal 18 made more like the conventional pedal than that shown in Figure 1, but in this case the part of the pedal which passes through the hole 19' in the floor board is made short and the pedal is so attached to the shaft 1' and of the brake mechanism that a short movement of the pedal will apply the brakes so that the foot need only be moved a short distance to apply the brakes and the foot portion of the pedal is so close to the floor that one can place his foot thereon while his heel is resting on the floor or his foot on a foot support, such as that shown at 14 in Figure 1, so that the foot is in a comfortable position and the driver will not be fatigued by frequent application of the brakes as is necessary with the pedals as now made and such as shown at 18' in dotted lines in Figure 4. This Figure 4 also shows the pedal connected with the shaft by an overrun device as before explained but this overrun device can be omitted where it is not necessary or desirable to use the right foot pedal or to permit this pedal to be moved after the foot is moved by the depression of the left pedal.

Figure 5 shows a left foot pedal 19 made somewhat similar to that shown in Figure 1 but this view shows the pedal as connecting to the arm 20 by a link 21 so that these parts are not adjustable as in Figure 1. However, in this arrangement the pedal will apply the brakes by a short movement of the pedal by the foot and the foot can be placed against the pedal while being held in a comfortable position and without necessitating raising the foot to a considerable height to place it on the pedal.

Figures 6 and 7 show another form of the invention in which a rod 22 is pivoted at one end to the floor as shown at 23 and its other end passes through a hole 24 formed in the right foot pedal 25. A shank of pedal 26 passes through a hole in the floor and is pivoted to the bar so that by depressing the pedal 26 the bar is moved downwardly to force the right pedal downwardly and thus apply the brakes.

It is understood that the parts can be arranged above the floor if desired.

While the invention contemplates the use of a pedal for the left foot with means for easily applying the brakes it is to be understood that this low mounted short stroke foot pedal can be used by the right foot by substituting it for the regular right foot brake pedal.

This left foot pedal can be used on any type of motor vehicles whereby the operator can apply the brakes by his left foot but it is especially useful on those vehicles where the clutch pedal has been eliminated as in such vehicles the left foot is only used to operate the dimmer switch for the lighting system so with my invention installed in these vehicles the left foot can operate the brake means while the right foot operates the accelerator, though, of course, where a brake pedal is used for the right foot this invention can be arranged so that it will lower the right foot pedal to permit the right foot to be easily and quickly shifted from the accelerator upon the right brake pedal.

As before stated the principal object of this invention is to provide a brake pedal so designed and so placed that the left foot of the operator can rest comfortably in a position for immediate application of the brakes at all times and the brakes will be applied very quickly by a short downward movement of the pedal and much more quickly than can be done with the conventional method of applying the brakes. The invention will cause less fatigue for the driver as he need not lift either foot from the floor as is now required and this is especially desirable when driving in heavy traffic which calls for a lot of quick stops.

While the drawings show mechanical means for transmitting the movement of the pedal to the brake mechanism, it is to be understood that the invention can be used with pressure or vacuum operated mechanisms now used on some vehicles.

Also, the invention is useful for operating the flipper switch S, as shown in Figure 1 as this switch can be actuated by the left foot without changing the foot from a comfortable position by a slight movement of the foot.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In brake mechanism for a vehicle, a pedal located to be operated by the left foot of an operator and means for actuating the mechanism by a short movement of the pedal, said pedal when in raised position lying close to the floor to be engaged by the foot with the foot held in a comfortable position, and means for adjustably connecting the pedal to the mechanism, said means including a link connected with the pedal, an arm forming part of the brake mechanism, said arm and said link having longitudinally extending rows of holes therein and a pin selectively passing through holes in the link and arm for adjustably connecting the pedal to the mechanism.

2. In a brake mechanism for a vehicle including a rock shaft, a right foot pedal connected with the shaft, a left foot pedal, a link pivoted to the left foot pedal, an arm freely mounted on the shaft and pivotally connected to the link in crossed relation, said shaft being operable by the right foot pedal without affecting the left foot pedal, and lugs carried by the shaft and the arm and engageable upon a depressing movement of the left foot pedal to actuate the shaft.

THOMAS D. FELTON.